May 21, 1957  E. GAGNAN  2,792,831
BREATHING APPARATUS FOR DIVING
Filed June 9, 1951

Inventor
Emile Gagnan
By Alan Ainsley
Attorney

United States Patent Office 2,792,831
Patented May 21, 1957

2,792,831
BREATHING APPARATUS FOR DIVING

Emile Gagnan, Montreal, Quebec, Canada, assignor to La Spirotechnique, Paris, France Application June 9, 1951, Serial No. 230,747

4 Claims. (Cl. 128—142)

This invention relates to the breathing apparatus for diving in which the gas breathed out by the diver is exhausted into the surrounding water through an exhaust-valve located close to the diaphragm of a regulator operating for feeding a breathable gas to the diver at a pressure substantially equal to the pressure applied on said diaphragm by the surrounding water. Such an arrangement is provided for allowing the diver to breathe in and out at a pressure which is as near as possible to the average pressure applied by the water on his thorax, the regulator diaphragm being located close to the body of the diver at a place which corresponds for the best at said average pressure.

In the usual practice, it is not possible to locate the exhaust valve at the very centre of pressure of the regulator diaphragm. The distance between the valve and the centre of pressure of water on the diaphragm may vary several centimeters without creating any appreciable difficulty in breathing out for the diver. However, the distance must be less than the height of a column of water representing the pressure necessary for the opening of the regulator valve for supplying breathable gas to the diver. If such a condition is not satisfied, the breathable gas escapes through the exhaust valve when the diver is in a position in which the shortest distance between said valve and the centre of pressure of the regulator diaphragm is measured along a vertical line with the exhaust valve above the diaphragm.

A main object of the invention is to improve the breathing apparatus of the type above described in order to prevent the breathable gas to escape through the exhaust valve, whatever the relative distance between the valve orifice and the regulator diaphragm may be in all positions adopted by the diver.

Another object of the invention is to provide a breathing apparatus in which the exhaust valve orifice may be placed at varying distances from the regulator diaphragm, but always in the proximity of the diaphragm, the regulator being adjusted so as to deliver breathable gas for a pressure measured by a column of water, at least equal in height to (and preferably slightly greater than) the distance between the centre of pressure of the regulator diaphragm and the exhaust valve.

In accordance with the present invention, supplementary means are provided for creating loss of head in the pipe which connects the regulator outlet with the exhaust valve so as to compensate for any difference in water pressure which may occur by the change of the relative positions of the exhaust valve orifice and the centre of the regulating diaphragm through the changing positions of the diver. Thus, the necessity for maintaining the exhaust valve orifice at a distance from the centre of pressure of the regulator diaphragm less than the height of a column of water representing the pressure necessary to operate the regulator, as described in U. S. Patent 2,485,039, is avoided.

Features of the invention relating to pressure compensating means for creating a loss of head in the pipe which connects the regulator outlet with the exhaust valve include the following:

(a) A valve urged in its closing position by a spring of a suitable strength provided at the outlet of the regulator in the pipe connecting the outlet with the mouth piece through which the diver inhales the breathable gas.

(b) A valve urged in its closing position by a spring of a suitable strength provided between the mouth piece and the pipe connecting the latter with the exhaust valve.

(c) Means are provided for applying to the exhaust valve a restraining effect acting so as to increase the pressure at which the exhaust valve is allowed to open.

(d) When the exhaust valve is a flap valve, means whereby it is clamped between rollers provided at the end of the arms of the bow spring so as to increase resistance.

The accompanying drawings show diagrammatically embodiments of the features described according to the invention.

Figure 1:
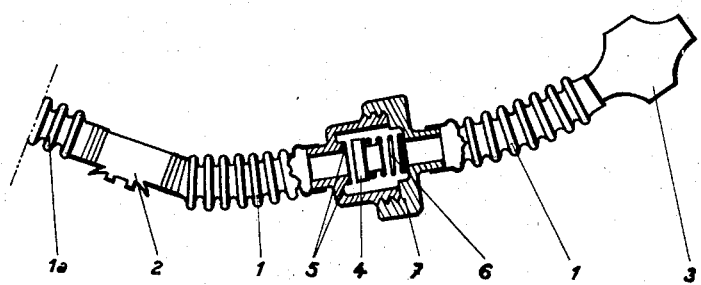
Figure 1 illustrates partly in section the pipe which connects the regulator outlet and the exhaust valve.

The pipe or flexible hose 1, into which the diver breathes in and out through a mouthpiece 2, is connected by the portion 1A to the outlet of the regulator of the breathing apparatus. The end of the pipe opposed to the portion 1A is provided with an exhaust valve, for instance of the flap valve type, which is suitably supported, for example, as described in U. S. Patent 2,485,039 granted to J. Y. Cousteau and the applicant on October 18, 1949, in the immediate proximity of the regulator diaphragm on which the pressure of the surrounding water is applied.

According to the present invention, a valve 4 is interposed between the mouth piece 2 and the exhaust valve 3.

The valve 4 opens under the pressure created in the hose 1 when the diver is breathing out and it is urged towards its seat 5 by a helical spring 6, the strength of which may be adjusted at will. The valve 4 and the spring 6 is preferably housed in a removable casing 7 as illustrated. If, as is preferred, the distance between the orifice of the exhaust valve 3 and the centre of pressure of the regulator diaphragm is greater than the height of a column of water representing the pressure necessary for opening the outlet of the regulator, and if it is not possible to adjust the regulator spring for bringing this relative pressure to a value at most equal to said distance, the spring 6 is adjusted so as to allow the valve 4 to open only when the pressure created in the hose 1, when the diver is breathing out, is greater than said relative pressure. The difficulty in breathing with this arrangement is negligible and losses of breathable gas are entirely avoided.

The effects above described can also be obtained by the alternative arrangement of providing a valve such as indicated at 4 between the outlet of the regulator and the mouth piece 2 (not illustrated). A loss of head is thus created in the portion of the hose 1a in which the diver is breathing in and, in an unfavourable position of the diver, the breathable gas is not at a pressure sufficient for opening the valve 4 and for escaping into the surrounding water through the exhaust valve 3. The valve 4 opens only under the effect of the diver's inhalation and the regulator valve opens also under the same effect.

Figure 2:
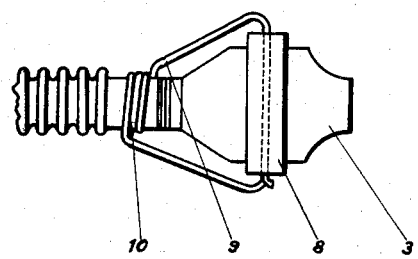
Figure 2 shows, at a larger scale, a top view of an exhaust valve of the flapper valve type including a roller type of valve restrainer.
Figure 3:
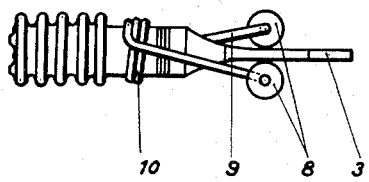
Figure 3 is a corresponding side elevation.

In the embodiment shown in Figures 2 and 3, the exhaust valve 3 is of the flap valve type offering no perceptible proper resistance to opening but, according to the present invention, means are provided for applying to the flap valve a means of resistance so that the flap valve 3 opens only when the pressure in the hose 1 corresponds to that represented by a column of water having a height at least equal to the vertical distance between the flap valve and the centre of pressure of the regulator diaphragm. Accordingly, the flap valve 3 shown is clamped between two rollers 8 journalled on the arms of a bow spring made, for example, of a length of steel wire indicated at 9 which is wound at 10 round the hose 1 or its connection with the valve 3. If the valve 3 is of the poppet valve type, the spring provided for seating it and which acts in the same direction as the pressure of the surrounding water, is adjusted to allow the valve to open only for a pressure in the hose 1 at least equal to the relative pressure measured for the operation of the regulator.

What I claim is:

1. In a breathing apparatus for diving of the type in which a breathable gas is delivered to the diver as long as a depression is maintained on the inner surface of the diaphragm of a pressure regulator, the outer face of said diaphragm being submitted to the pressure of the surrounding water, the air expelled by the diver being exhausted through an exhaust valve so positioned that the distance between it and the center of the operative portion of said diaphragm is less than the height of a column of the surrounding water representing the pressure necessary for operating said regulator, a means of connecting said regulator and said exhaust valve including a hollow flexible body having one of its ends adapted for connection to the outlet of said regulator and its other end adapted for connection to said exhaust valve, a mouth piece provided on the flexible body at a point located between its ends for allowing the diver to breathe in and out through said body and resiliently biased pressure resisting means supported by said body and acting in co-operation with said exhaust valve adapted to compensate for variance in pressure due to changes of the relative positions of said exhaust valve and said center of pressure of said diaphragm.

2. A breathing apparatus according to claim 1 wherein said resiliently biased pressure resisting means comprises an intermediary exhaust valve in said flexible body between said mouth piece and the end of said body adapted for connection with said exhaust valve and resilient means acting on said intermediary valve adapted to urge said intermediary valve towards its closed position.

3. A breathing apparatus according to claim 1 wherein said resiliently biased pressure means is mounted on the end of said flexible body adapted for connection with said exhaust valve and includes portions adapted to act on the orifice of said exhaust valve.

4. A breathing apparatus according to claim 3 wherein said resiliently biased pressure means comprises a bow spring mounted on the end of said flexible body and surrounding a portion of said exhaust valve, said bow spring including opposed arms resiliently urged toward each other and roller mounted on each of said arms, said rollers being disposed one at each side of said valve adjacent the exhaust orifice.

References Cited in the file of this patent

UNITED STATES PATENTS

| 46,902 | Hawkins | Mar. 21, 1865 |
| 2,446,571 | Browne | Aug. 10, 1948 |
| 2,485,039 | Cousteau | Oct. 18, 1949 |

FOREIGN PATENTS

| 457,663 | Great Britain | Dec. 3, 1936 |

OTHER REFERENCES

The Physics and Physiology of Diving, July 20, 1925, page 13. Photostat copy in Div. 55.